W. E. KNIGHT.
DENTAL MIRROR.
APPLICATION FILED SEPT. 26, 1921.
1,423,225.
Patented July 18, 1922.
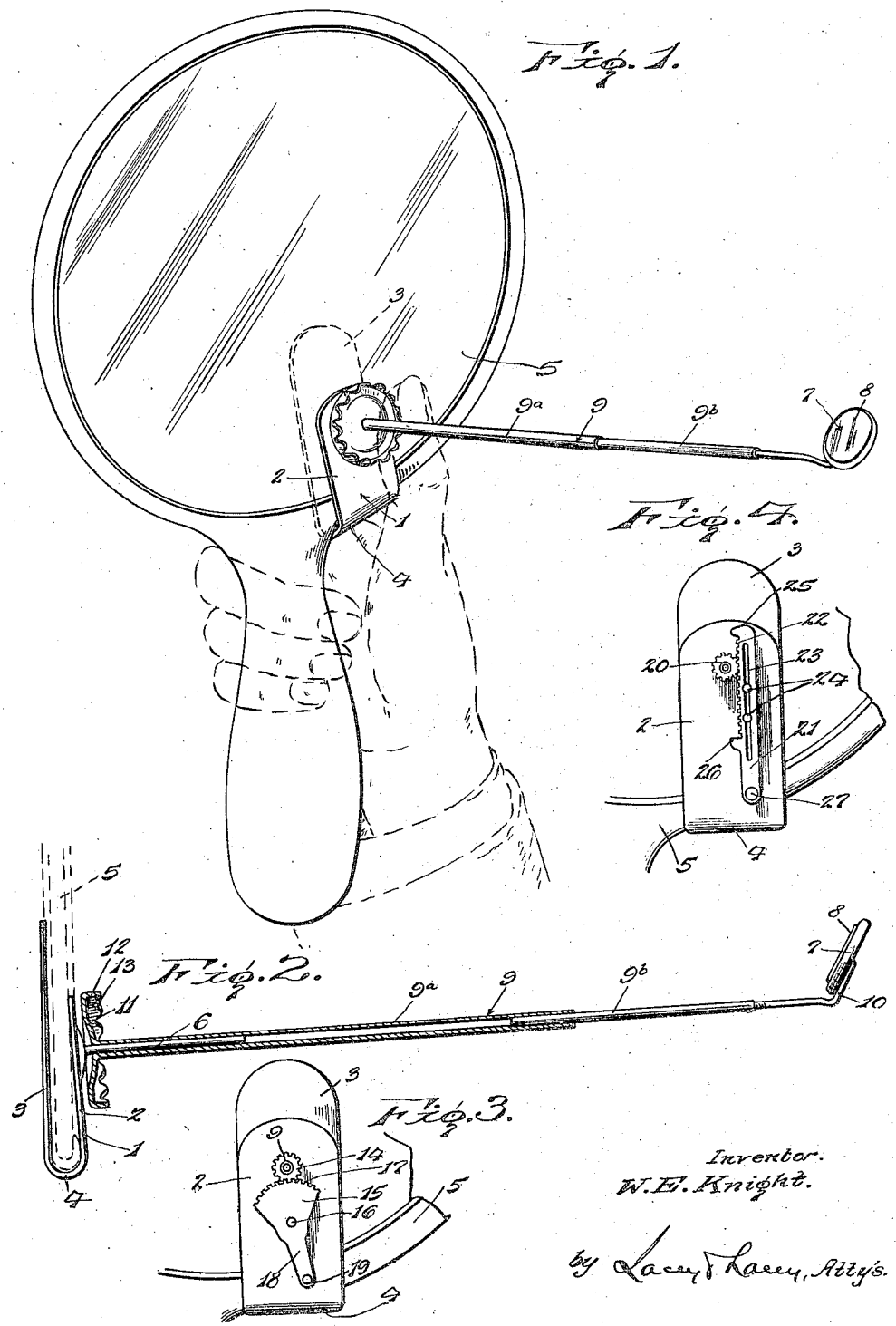
Inventor:
W. E. Knight.

UNITED STATES PATENT OFFICE.

WILLIAM E. KNIGHT, OF DELAWARE, OHIO.

DENTAL MIRROR.

1,423,225.    Specification of Letters Patent.    Patented July 18, 1922.

Application filed September 26, 1921. Serial No. 503,330.

*To all whom it may concern:*

Be it known that I, WILLIAM E. KNIGHT, a citizen of the United States, residing at Delaware, in the county of Delaware and State of Ohio, have invented certain new and useful Improvements in Dental Mirrors, of which the following is a specification.

This invention relates to dental mirrors and more particularly to an attachment for a hand mirror by the employment of which a self-examination may be made of one's teeth.

One of the primary objects of the present invention is to provide a device for the purpose stated, the mirror or reflecting element of which may be readily angularly adjusted by the same hand which grasps and supports the hand mirror to which the device is attached thus leaving the other hand free to assist in the examination.

Another object of the invention is to provide a device for the purpose stated which may be readily attached to and detached from any ordinary hand mirror and may be adjusted to any desired position with relation to the face of the mirror to most clearly bring into view the reflection of the mirror element of the device.

Another object of the invention is to so construct the means for supporting the mirror of the attachment that the said mirror may be adjusted to occupy a position more or less remote from the reflecting surface of the hand mirror to which the device is applied and thereby compensate for defects in vision of the one using the attachment.

In the accompanying drawings:

Figure 1 is a perspective view of the device embodying the present invention, the view illustrating the manner in which the same is to be employed in connection with an ordinary hand mirror.

Fig. 2 is a vertical longitudinal sectional view through the device applied;

Fig. 3 is a transverse sectional view illustrating in elevation a modified form of means for angularly adjusting the mirror support;

Fig. 4 is a view similar to Fig. 3 illustrating another modified form of this means.

The attachment embodying the present invention includes in its structure an attaching member which is indicated in general by the numeral 1 and which is preferably formed from sheet metal and includes spaced resilient portions 2 and 3 and a connecting portion 4 extending between the lower ends of the said portions 2 and 3. The tendency of the portions 2 and 3 is to spring together and, being flat, they are designed to bear snugly respectively against the front and rear sides of any ordinary hand mirror 5 to which the attachment may be applied, the attaching member 1 being frictionally held in place upon the mirror 5 and at the same time being capable of being moved about the margin of the mirror to any desired position. A stem 6, preferably cylindrical in cross section, is secured to the forward face of the portion 2 of the member 1 and projects forwardly substantially at right angles to the plane of this said portion. The purpose of this stem will presently be made clear.

The mirror of the attachment is indicated by the numeral 7 and is preferably provided with a slightly convex reflecting face 8, and this mirror is supported at the outer end of a supporting arm which is indicated in general by the numeral 9 and lies at an obtuse angle to the length of the arm, the terminal portion of the arm being bent upwardly at the required angle as indicated by the numeral 10 to provide a support to which the mirror 7 may be secured in any suitable manner. The arm 9 is tubular and at its inner end is frictionally and yet rotatably fitted over the stem 6 as clearly shown in Fig. 2 of the drawings. By reference to the said figure and Fig. 1 it will be evident that the reflecting surface of the mirror 7 faces the corresponding surface of the mirror 5 and at such an angle as to best enable the user of the device observing in the mirror 5 the reflection of the mirror 7. At this point it will be evident that inasmuch as the inner end of the tubular supporting arm 9 is frictionally fitted onto the stem 6, the arm may be fitted onto the stem to occupy the innermost position shown in Fig. 2 or it may be slid outwardly upon the stem so as to position the mirror 7 a correspondingly greater distance from the reflecting surface of the mirror 5, and the extent of this adjustment will of course, depend upon the defects in vision to be compensated for.

In order that both the upper and lower teeth may be examined, it is, of course, necessary that the mirror 7 be capable of angular adjustment and this may be accomplished by rotating the supporting arm 9 upon the stem 6. Various means may be provided for this purpose but I prefer to employ the means shown in Figs. 1 and 2 of the drawings in which figures the numeral 11 indicates a circular disk or head which is formed or secured at the inner end of the arm 9 and which is provided with a peripheral flange 12 which projects toward the outer end of the arm 9 and is formed with a series of teeth or scallops 13 with which the thumb of the hand which supports the hand mirror 5, may be brought into engagement and the thumb then moved so as to rotate or partially rotate the arm 9 about the stem 6 and thus suitably rotatably swing the mirror 7 to reflect an image of the portion of the mouth which it is desired to inspect. In this manner an extremely simple and yet highly efficient means is provided for conveniently rotating the supporting arm 9 by the same hand which supports the hand mirror to which the attachment is applied thus leaving the other hand free to be of assistance in making the examination.

If desired, a means such as shown in Fig. 3 of the drawings may be provided in lieu of the disk 11 and in this figure the numeral 14 indicates a small pinion which is fixed upon the inner end of the arm 9, and 15 indicates an arcuate rack which is mounted for oscillation as at 16 upon the portion 2 of the attaching member 1, the teeth 17 of this rack meshing with the pinion and the rack being provided with an arm 18 at the opposite side of the pivot 16 to the toothed edge 17 of the rack and upon which arm there is carried a finger piece or knob 19 whereby the rack may be readily oscillated by the thumb of the hand which grasps the hand mirror 5. Another arrangement is shown in Fig. 4 of the drawings in which figure the numeral 20 indicates a pinion corresponding to the pinion 14, and the numeral 21 indicates a rack bar having teeth 22 meshing with the said pinion 20, the bar being formed with a slot 23 through which project guide lugs or studs 24 upon the said portion 2 of the attaching member 1 so that the rack is guided for up and down sliding movement beside the pinion 20. Upper and lower lugs or shoulders 25 and 26 at the ends of series of rack teeth 22 serve to limit the up and down movement of the rack bar which movement is accomplished by the engagement of the thumb against a knob or finger piece 27 carried by the lower end of the said bar.

It will be evident that the member 1 constitutes a base upon which the supporting arm 9 is axially rotatably mounted.

The tubular arm 9 which supports the mirror 7 preferably comprises telescopic sections 9ª and 9ᵇ, the latter telescoping into the former and the former being frictionally fitted onto the stem 6. In this manner considerable latitude is afforded in adjusting the mirror 7 in relation to the mirror 5.

Having thus described the invention, what is claimed as new is:

1. In a device of the class described, a base member, a stem extending therefrom, a supporting arm rotatably fitting the stem, a mirror supported by the arm, and operating means for rotating the arm.

2. In a device of the class described, a base member, an arm axially rotatably mounted thereon, a mirror supported by the arm at an angle to the axis thereof and facing the general direction of the base member, and an operating means for rotating the arm.

3. In a device of the class described, a base member, a supporting arm axially rotatably mounted thereon, a mirror supported by the arm and facing in the general direction of the base member, and a member upon the inner portion of the arm having an irregular peripheral portion manually engageable to rotate the arm.

4. In a device of the class described, a base member, a supporting arm axially rotatably mounted thereon, a mirror carried by the arm, and a member carried by the arm adjacent the base portion and provided with a peripheral flange projecting toward the mirror and having its edge of irregular outline whereby to be manually engageable to rotate the arm.

5. In a device of the class described, a base member, a stem projecting from the said base member, a tubular supporting arm rotatably fitting the stem, a head carried by the arm at its end adjacent the base member and having an irregular peripheral portion engageable by the hand to effect rotation of the arm upon the stem, and a mirror provided with a stem telescopically fitting the said arm and presented in the general direction of the said base.

In testimony whereof I affix my signature.

WILLIAM E. KNIGHT. [L. S.]